April 15, 1969    E. TARCHALSKI    3,438,536
REMOVABLE COVERS
Filed Nov. 24, 1967
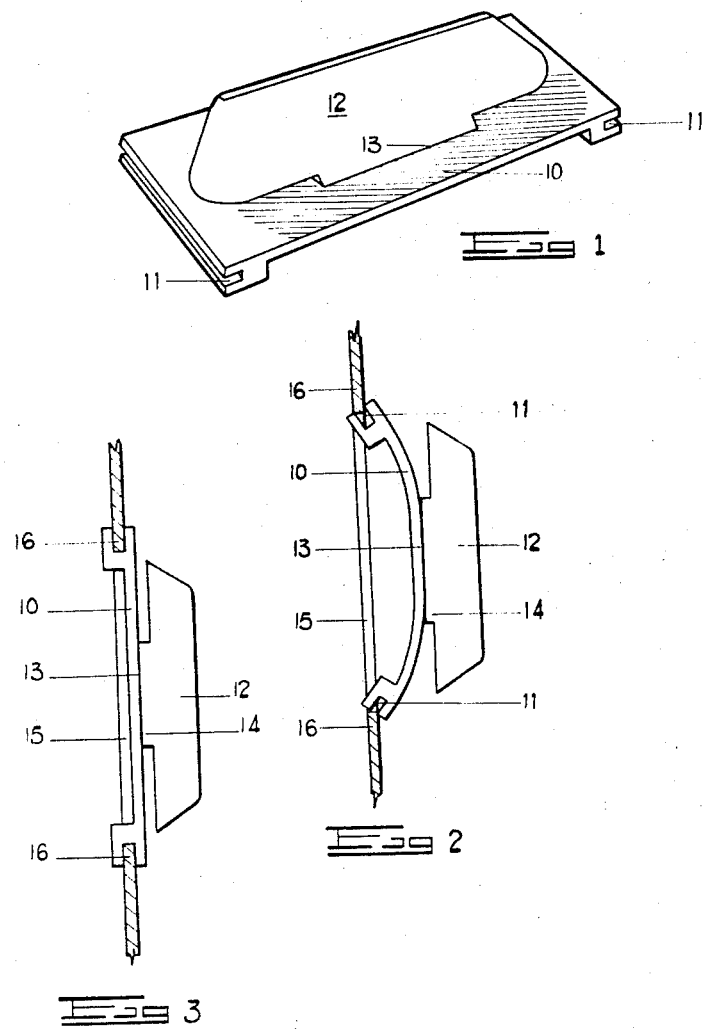
INVENTOR
EDWARD TARCHALSKI
BY Young & Thompson
ATTY:

United States Patent Office 3,438,536
Patented Apr. 15, 1969

3,438,536
REMOVABLE COVERS
Edward Tarchalski, Johannesburg, Transvaal, Republic of South Africa, assignor to Heinemann Electric (S.A.) Limited, Johannesburg, Republic of South Africa
Filed Nov. 24, 1967, Ser. No. 685,371
Claims priority, application Republic of South Africa, Nov. 29, 1966, 66/7,213
Int. Cl. B65d 43/10, 51/00
U.S. Cl. 220—27                                            4 Claims

ABSTRACT OF THE DISCLOSURE

A removable cover for closing unsightly openings comprising a panel made of resilient material and a reinforcing rib attached to one side of the panel so that the panel can be flexed in one direction to facilitate the insertion thereof into the opening but cannot be flexed in the opposite direction.

---

This invention relates to removable covers.

Electrical switchboards, particularly those used in domestic installations, generally have a large opening in which items such as circuit breakers are mounted. It frequently happens that only a portion of this opening is utilized which means that unsightly and dangerous gaps are left in the surface of the switchboard. Such gaps are usually closed by some type of removable cover and the present invention is directed to such covers.

The conventional cover of the type mentioned above is made of either a thermosetting or a thermoplastic material. Both known types have disadvantages. The thermosetting type is fairly expensive to manufacture and is adapted to be secured to the switchboard in an unnecessarily complicated manner. The thermoplastic type is secured in the opening by flexing the cover, locating it in the opening and allowing it to resume its normal unflexed condition. The disadvantage is that the covers can be flexed in all directions with the result that they can be easily pushed into the interior of the switchboard.

It is an object of the present invention to provide a removable cover of the type described in which the above-mentioned disadvantages have been eliminated or at least minimized.

A removable cover according to the invention comprises a panel, formations on the panel adapted to engage the sides of an opening and a substantially rigid rib attached to one side of the panel to extend along at least the greater part of the length of the panel, at least one end of the panel being adapted to be flexed away from the rib to facilitate the mounting of the panel in the opening whereas flexing of that end of the panel in the opposite direction is inhibited by the rib itself.

Further according to the invention the rib is substantially centrally attached to the panel so that both ends of the panel can be flexed away from the rib.

To illustrate the invention an embodiment thereof is described hereunder with reference to the accompanying drawings in which:

FIGURE 1 is an isometric view of a cover according to the invention,

FIGURE 2 is a side view of the cover in an opening and;

FIGURE 3 illustrates the manner in which the cover is mounted in an opening.

In the drawings a rectangular panel 10 is made of thermoplastic or any other suitable resilient material. Rebates 11 are formed along the two short edges. A stubby reinforcing rib 12 is attached to the upper surface of the panel 10 at 13, the rib 12 being provided with a protruding portion 14 for this purpose. The rib 12 may also be made of thermoplastic material but due to its thickness it is substantially rigid. The length of the rib 12 is such that its ends extend to points just short of the two short edges of the panel. Preferably the ends of the rib lie above the rebated edges 11.

It will be apparent from the drawings that the short edges of the panel 10 can therefore be flexed away from the rib 12 (as shown in FIGURE 2) to permit the panel to be located in an opening 15 but the rib 12 makes it impossible for the panel to be flexed in the opposite direction.

In use therefore the panel is flexed as shown in FIGURE 2, the rebates 11 are engaged with the edges 16 of the opening and the panel is then allowed to resume its unflexed position by virtue of its inherent resiliency. Due to the fact that the panel cannot be flexed in the direction of the rib the panel cannot be pushed into the opening 15.

In the embodiment illustrated in the drawing both edges of the panel can be flexed away from the rib. It is however possible to obtain satisfactory results even if only one edge of the panel is flexible relative to the rib.

I claim:

1. A removable cover of the type described comprising a substantially rectangular panel at least an end portion of which is resiliently flexible, a formation on the edge of the flexible end of the panel portion and on an edge of the panel opposed thereto, the formations being adapted to engage the sides of an opening, and a substantially rigid rib a portion of which is attached to one face of the panel and at least one end of which extends freely over the flexible end portion so that the flexible end portion can be flexed away from the rib to facilitate the mounting of the panel in the opening whereas the flexing of the flexible end portion in the opposite direction is limited by the rib.

2. A removable cover as claimed in claim 1 in which the said end of the rib extends partially over the formation on the edge of the flexible end portion.

3. A removable cover of the type described comprising a substantially rectangular panel of a resiliently flexible material, a formation on each of two opposed edges of the panel adapted to engage with the sides of an opening, and a substantially rigid rib a central portion of which is attached to one face of the panel and the ends of which extend freely over the panel towards the formations so that the ends of the panels containing the formations can be flexed away from the rib to facilitate the mounting of the panel in the opening whereas the flexing of the said ends in the opposite direction is limited by the rib.

4. A removable cover as claimed in claim 3 in which the ends of the rib extend partially over the formations.

References Cited

UNITED STATES PATENTS 1,491,325   4/1924   Thomas _____ 220—24.5 XR
3,366,267   1/1968   Boyer _____ 220—27

GEORGE T. HALL, Primary Examiner.

U.S. Cl. X.R.

220—3.8, 60, 24.3